United States Patent
Wilson

(10) Patent No.: US 6,454,974 B1
(45) Date of Patent: Sep. 24, 2002

(54) METHOD FOR VACUUM PRESSURE FORMING REINFORCED PLASTIC ARTICLES

(75) Inventor: Phillip S. Wilson, Commerce Township, MI (US)

(73) Assignee: Magna International of America, Inc., Troy, MI (US)

( * ) Notice: Subject to any disclaimer, the term of this patent is extended or adjusted under 35 U.S.C. 154(b) by 0 days.

(21) Appl. No.: 09/857,768

(22) PCT Filed: Dec. 17, 1999

(86) PCT No.: PCT/US99/29987

§ 371 (c)(1), (2), (4) Date: Jun. 11, 2001

(87) PCT Pub. No.: WO00/37230

PCT Pub. Date: Jun. 29, 2000

Related U.S. Application Data

(60) Provisional application No. 60/113,064, filed on Dec. 21, 1998.

(51) Int. Cl.[7] .............................................. B29C 44/06
(52) U.S. Cl. .................. 264/46.8; 264/46.4; 264/46.6; 264/250; 264/320; 264/553; 264/572
(58) Field of Search .............................. 264/46.4, 46.6, 264/46.8, 320, 553, 572, 250

(56) References Cited

U.S. PATENT DOCUMENTS

| | | | |
|---|---|---|---|
| 3,497,409 A | | 2/1970 | Clem |
| 3,703,572 A | * | 11/1972 | Bellasalma ................ 264/46.8 |
| 4,002,520 A | * | 1/1977 | Fenton .......................... 156/246 |

(List continued on next page.)

FOREIGN PATENT DOCUMENTS

| | | |
|---|---|---|
| CA | 2142764 | 8/1995 |
| EP | 0 027 338 | 4/1981 |
| EP | 0 352 042 B1 | 3/1995 |

(List continued on next page.)

OTHER PUBLICATIONS

Porter et al. Journal of Polymer Science: Part B: Polymer Physics—"Inorganic/Organic Host–Guest Materials: Surface and Interclay Reactions of Styrene with Cooper (II)–Exchanged Hectorite"; vol. 36, 673–679, Mar. 1998.

(List continued on next page.)

Primary Examiner—Allan R. Kuhns
(74) Attorney, Agent, or Firm—Pillsbury Winthrop LLP

(57) ABSTRACT

A method for thermoforming a reinforced article, comprising: providing a reinforced plastic sheet comprising at least one thermoplastic material and reinforcement nanoparticles dispersed within the at least one thermoplastic material, the reinforcement particles comprising less than 15% of a total volume of the plastic sheet, at least 50% of the reinforcement particles having a thickness of less than about 20 layers, and at least 99% of the reinforcement particles having a thickness of less than about 30 layers; preheating said plastic sheet; communicating said preheated plastic sheet to a first mold assembly having a first mold cavity defined by mold surfaces, the mold surfaces corresponding to a configuration of the article to be molded, an amount of the plastic sheet communicated to the first mold assembly being sufficient to form a skin of the article; applying a vacuum to one side of the first mold assembly while concurrently applying pressurized gas to an opposing side of the first mold assembly so as to force said heated plastic sheet into conformity with the mold surfaces; cooling the conformed plastic sheet; transferring the conformed plastic sheet to a second mold assembly; introducing to the conformed plastic sheet a reinforced plastic melt made from material identical or different from that of the plastic sheet, said plastic melt having a blowing agent to achieve volume expansion and the production of a cellular reticulate structure; cooling said plastic melt to form a solidified plastic member adhered to said conformed plastic sheet, said conformed plastic sheet and said adhered solidified plastic member together comprising said article; and removing said article from said second mold assembly.

1 Claim, 2 Drawing Sheets

U.S. PATENT DOCUMENTS

| | | | |
|---|---|---|---|
| 4,278,629 A | * | 7/1981 | Bennett .................... 264/46.8 |
| 4,739,007 A | | 4/1988 | Okada et al. |
| 4,945,682 A | | 8/1990 | Altman et al. |
| 5,207,957 A | * | 5/1993 | Heath et al. ............... 264/46.8 |
| 5,239,406 A | | 8/1993 | Lynam |
| 5,552,469 A | | 9/1996 | Beall et al. |
| 5,576,372 A | | 11/1996 | Kresge et al. |
| 5,576,373 A | | 11/1996 | Kresge et al. |
| 5,591,289 A | | 1/1997 | Souders et al. |
| 5,624,619 A | | 4/1997 | Pelzer |
| 5,626,704 A | | 5/1997 | Bowers, Jr. et al. |
| 5,643,998 A | | 7/1997 | Nakano et al. |
| 5,652,284 A | | 7/1997 | Eidt, Jr. et al. |
| 5,656,215 A | * | 8/1997 | Eckardt et al. ............. 264/572 |
| 5,660,428 A | | 8/1997 | Catlin |
| 5,665,183 A | | 9/1997 | Kresge et al. |
| 5,672,397 A | | 9/1997 | Bowers, Jr. et al. |
| 5,688,866 A | | 11/1997 | Silvis et al. |
| 5,693,710 A | | 12/1997 | Srinivasan et al. |
| 5,698,624 A | | 12/1997 | Beall et al. |
| 5,705,222 A | | 1/1998 | Somasundaran et al. |
| 5,712,003 A | | 1/1998 | Suenaga et al. |
| 5,716,560 A | | 2/1998 | Heuchert et al. |
| 5,717,000 A | | 2/1998 | Karande et al. |
| 5,728,443 A | | 3/1998 | Bowers, Jr. et al. |
| 5,728,465 A | | 3/1998 | Dorfman et al. |
| 5,733,644 A | | 3/1998 | Tanaka et al. |
| 5,741,860 A | | 4/1998 | Matsumoto et al. |
| 5,743,983 A | | 4/1998 | Ogata et al. |
| 5,747,560 A | | 5/1998 | Christiani et al. |
| 5,750,062 A | | 5/1998 | Tsukamoto |
| 5,750,600 A | | 5/1998 | Nozokido et al. |
| 5,849,830 A | | 12/1998 | Tsipursky et al. |
| 5,883,173 A | | 3/1999 | Elspass et al. |

FOREIGN PATENT DOCUMENTS

| | | |
|---|---|---|
| EP | 0 437 096 B1 | 9/1996 |
| EP | 0 747 323 | 12/1996 |
| WO | WO 93/04847 | 3/1993 |
| WO | WO 93/11190 | 6/1993 |
| WO | WO 94/22680 | 10/1994 |

OTHER PUBLICATIONS

Hasegawa et al. Journal of Applied Polymer Science—"Preparation and Mechanical Properties of Polypropylene–Clay Hybrids Using a Maleic Anhydride–Modified Polypropylene Oligomer"; vol. 67, 87–92, Jan. 3, 1998.

Ou et al. Journal of Polymer Science: Part B: Polymer Physics—A New Conception on the Toughness of Nylon 6/Silica Nanocomposite Prepared via In Situ Polymerization; vol. 36, 789–795, Apr. 15, 1998.

Modern Plastics, "Nanocomposites showing promise in automotive and packaging roles", Feb. 1998, pp. 26–28.

Abstract—JP9316119A: "Olefin Polymerization Catalyst and Polymerization of Olefin Using the Same" (Dec. 1997).

Abstract—JP8027339A: "Heat Resistant Vinyl Chloride Resin Composition" (Jan. 1996).

Abstract—JP8127089A: "Multilayered Plastic Fuel Tank" (May 1996).

Abstract—JP9048896A: "Vinyl Chloride–Based Resin Composition for Powder Molding" (Feb. 1997).

Abstract—JP9048897A: "Vinyl Chloride–Based Resin Composition for Powder Molding" (Feb. 1997).

Abstract—JP9067493A: "Chenille Under Door" (Mar. 1997).

Abstract—JP9077943A: "Vinyl Chloride Resin Composition for Paste" (Mar. 1997).

Abstract—JP 9137019A: "Vinyl Chloride Resin Composition for Powder Molding" (Nov. 1997).

Abstract—JP 10060037A: "Catalyst for Polymering Olefin and Polymerization of Olefin in Presence of the Catalyst" (Mar. 1998).

Abstract—JP 2029457A: "High–Rigidity and High–Impact Polyamide Resin Composition" (Jan. 1990.)

Abstract—JP2166157A: "Resin Composition" (Jun. 1990).

Abstract—JP2208357A: "Material for Automotive Trim" (Aug. 1990).

Abstract—JP2208358A: "Highly Rigid and Heat–Resistant Polyamide Resin Composition" (Aug. 1990).

Abstract—JP2240160A: "Material for Part in Automotive Engine Room" (Sep. 1990).

Abstract—JP3024155A: "Polyamide Blow Molding Material" (Feb. 1991).

Abstract—JP3215556A: "Resin Composition" (Sep. 1991).

Abstract—JP3215557A: "Resin Composition" (Sep. 1991).

Abstract—JP4180965A: "Preparation of Modified Composite Material" (Jun. 1992).

Abstract—JP4305444A: "Foamed Sheet Material and Preparation Thereof" (Oct. 1992).

Abstract—JP5293916A: "Multilayer Fuel Tube for Automobile" (Nov. 1993).

Abstract—JP63132933A: "Thermotropic Liquid Crystal Copolyester" (Jun. 1988).

Abstract—JP7324160A: "Polyphenylene Ether Resin Composition" (Dec. 1995).

* cited by examiner

METHOD FOR VACUUM PRESSURE FORMING REINFORCED PLASTIC ARTICLES

This patent application claims priority from U.S. Provisional Application No. 60/113,064, filed Dec. 21, 1998.

FIELD OF THE INVENTION

The present invention relates to vacuum forming or pressure forming articles and apparatuses, and, more particularly, a molding method combining vacuum and pressure for producing reinforced thermoplastic articles. The invention also relates to molded articles having reinforced foam fillers.

BACKGROUND OF THE INVENTION

Traditional blow molding is limited as to the wall thickness of the article to be formed, as well as the complexity of article shape. To overcome this, thermoforming, a modification of blow molding, can suffice for manufacturing articles having relatively thick walls and/or complex shapes. Thermoforming processes such as plug assisted vacuum forming or pressure forming permit the production of items having a wall thickness of up to about 3/8 inch (95.25 mm). Articles formed by conventional blow molding, by contrast, are usually limited to wall thicknesses of less than about 1/8 inch (31.75 mm). This is due, in part, to the negative effects exerted on the blowing process by the greater volumes of polymer resin required to achieve thicker walls. For example, increasing amounts of viscous molten polymer will limit the size, wall thickness and complexity of an article to be formed, as blown air becomes progressively ineffective at expanding molten polymer as the volume of polymer material increases.

In basic vacuum forming, a carrier frame delivers a heated plastic sheet to a mold assembly, after which the sheet is clamped and sealed against the mold edge surfaces. Application of a vacuum causes atmospheric pressure to force the sheet against the mold cavity to assume the cavity shape. Mold cooling promotes the formation of a thin sheet having the dimensions defined by the mold.

As a variation of blow molding, the above-mentioned process further includes the step of blowing air of controlled pressure to force the heated sheet away from the cavity into a bubble. A shaped plug is then inserted into the bubble, pressing the bubble back into the mold cavity after the sheet has been sealed across the mold cavity. Upon reaching the bottom of the mold cavity, compressed air and/or a vacuum is applied to force the sheet against the mold. After forcing the sheet into the cavity, a full vacuum is applied from the cavity side and positive pressure is applied from the plug side of the apparatus to complete the formation of a molded article. After it has solidified, the mold assembly is opened, and the article is removed.

In a similar fashion, drape forming entails either draping a plastic sheet over or moving a male mold into a plastic sheet, and thereafter clamping, heating, and sealing the sheet over the male mold. Numerous vent holes in the mold apparatus permit a vacuum to be drawn, allowing atmospheric pressure to force the draped sheet into the contours of the mold cavity. Upon cooling, the sheet shrinks onto the mold.

Typical vacuum-formed or pressure-formed products include blister and skin packaging, food and drink containers, toys, luggage, and auto and appliance parts. Polystyrene, polypropylene, HDPE, thermoplastic polyester, ABS and vinyls are often used to manufacture these articles. Films and sheets formed in this fashion are often laminated by melt or adhesive processes to enhance their functional performance.

A need has arisen for reinforced blow molded articles having good thermoinsulating and sound barrier properties. In particular, the resurgence in popularity of removable hard tops and T-tops for automobiles has prompted engineers to seek better insulating characteristics of blow molded articles. For example, lightweight, suitably thermoinsulated removable hard tops for sport utility vehicles (SUVs) are in high demand by consumers. While blow molding provides for sufficiently lightweight automobile parts, combining the suitable weight properties with good impact resistance and thermoinsulating properties has heretofore been difficult.

The usefulness of blow molding techniques for forming such impact resistant, thermoinsulated articles has not been practical due to the structural characteristics of the plastic material conventionally used in blow molding. That is, the ability to blow mold light weight, thermoinsulated parts is limited by the fact that the parts produced can be only so large or so thin before the parts lose their structural integrity and impact resistance.

Further, most insulating materials must be laminated to the part after blow molding into the desired shaped. For example, urethane foam may be introduced to a blow molded part to improve insulating capabilities, as well as dimensional stability. However, this process is plagued by incompatibility between the skin component of the molded part and the insulating foam filler. Expensive thermoplastic skins are often chemically incompatible with traditional foam insulating materials, preventing strong bond formation within laminated structures. Thus, blow molded articles having skin and foam fillers of different materials are prone to delamination. A solution to the delamination problem is to fill the article with a foamed resin identical to the resin used to form the exterior skin of the article. Although this expensive concept is acceptable for many blown articles, it is insufficient for producing a cost-effective automobile part having good impact resistance.

Blow molded articles such as sport utility vehicle (SUV) hard tops require good thermoinsulation while exhibiting strong impact resistance. By nature, structural foams lack good impact resistance due to their open cellular conformation. Thus, blow molded automobile parts having structural foam insulating materials compatible with an exterior resin skin require reinforcement.

Heretofore, in order to reinforce various plastic parts, such parts would conventionally comprise resins fortified by mineral fillers or glass fibers. However, such reinforcement cannot be used effectively in blow molding operations because the glass fibers limit parison expansion characteristics and also have a deleterious effect on the blow molding assembly itself. Furthermore, such reinforcement has a deteriorating effect on the foaming capabilities of resins. Thus, blow molded articles having a structural foam component subjected to conventional reinforcement often lack uniform strength and impact resistance.

Similarly, thermoformed articles having foam backing typically lack satisfactory levels of impact resistance due to both the need for an aesthetically pleasing skin and the open cellular nature of reticulated foam. Exterior skin appearance deteriorates with increasing amounts of conventional reinforcing materials. Typical reinforcing materials tend to impair the formation of reticulated cells during blowing of foam resins. Because structural foams are not adequately reinforced by conventional means, thermoformed articles comprising good quality skins laminated to foam backing have inadequate strength and impact resistance.

SUMMARY OF THE INVENTION

It is an object of the present invention to overcome the problems noted hereinabove. In achieving this object, the present invention provides a method for thermoforming reinforced, insulated thermoplastic parts. Accordingly, the present invention provides a method for molding articles, comprising the steps of providing a first reinforced plastic sheet comprising at least one thermoplastic material and reinforcement nanoparticles dispersed within the at least one thermoplastic material. The reinforcement particles comprising less than 15% of a total volume of the plastic sheet, and at least 50% of the reinforcement particles having a thickness of less than about 20 layers, and at least 99% of the reinforcement particles having a thickness of less than about 30 layers. The heated plastic sheet is communicated to a first mold assembly having a first mold cavity defined by mold surfaces. The mold surfaces correspond to a configuration of the article to be molded. An amount of the plastic sheet is communicated to the first mold assembly being sufficient to form a skin of the article. A vacuum is applied to one side of the first mold assembly while concurrently applying pressurized gas to an opposing side of the first mold assembly so as to force the heated plastic sheet into conformity with the mold surfaces. The conformed plastic sheet is then cooled. The conformed plastic sheet is then transferred to a second mold assembly. A reinforced plastic melt made from material identical or different from that of the plastic sheet is introduced to the conformed plastic sheet. The plastic melt has a blowing agent to achieve volume expansion and the production of a cellular reticulate structure. The plastic melt is then cooled to form a solidified plastic member adhered to the conformed plastic sheet. The conformed plastic sheet and the adhered solidified plastic member together comprise the article. The article is removed from the second mold assembly.

It is also an object of the invention to produce reinforced parts for automotive applications via plug assisted thermoforming, which has heretofore been impractical.

An embodiment of the invention is a child safety seat having a reinforced outer skin member and a reinforced foamed structural member. The seat members are formed from at least one thermoplastic material and reinforcement nanoparticles dispersed within the at least one thermoplastic material. The reinforcement particles comprise about 2% to about 15% of a total volume of the molded hard top, at least 50% of the reinforcement particles have a thickness of less than about 20 layers, and at least 99% of the reinforcement particles have a thickness of less than about 30 layers.

In another embodiment, a substantially hollow molded hard top for an automobile which is filled with foamed insulating material is formed from at least one thermoplastic material and reinforcement nanoparticles dispersed within the at least one thermoplastic material. The reinforcement particles comprise about 2% to about 15% of a total volume of the molded hard top, at least 50% of the reinforcement particles have a thickness of less than about 20 layers, and at least 99% of the reinforcement particles have a thickness of less than about 30 layers.

Other objects and advantages of the present invention will become apparent from the following detailed description.

BRIEF DESCRIPTION OF THE DRAWINGS

A preferred embodiment of the present invention is described herein with reference to the drawing wherein.

DESCRIPTION OF THE PREFERRED EMBODIMENTS

Figure 1:
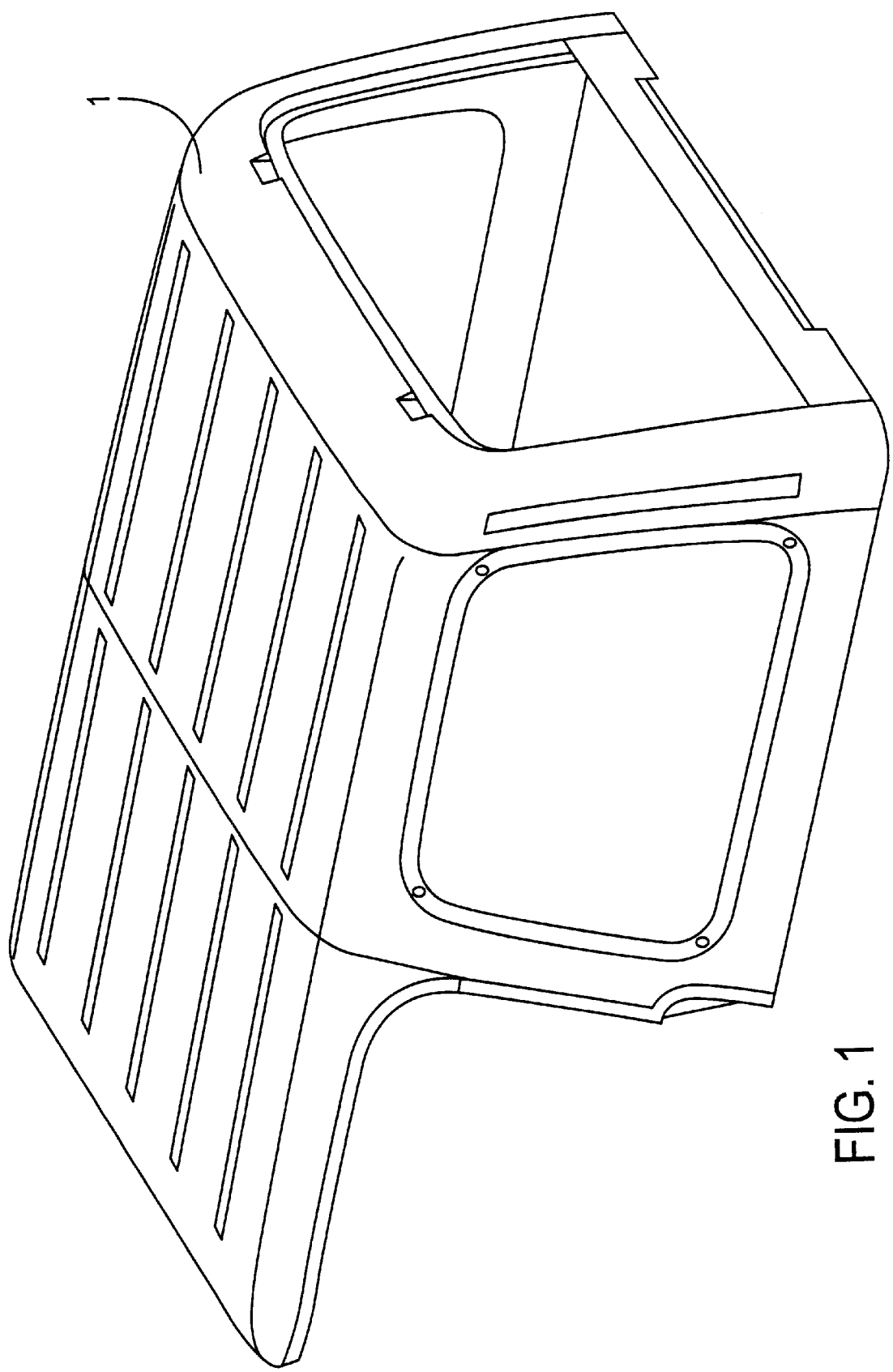
FIG. 1 shows a perspective view of a sport utility vehicle hardtop contemplated by the invention.

It is contemplated that reinforced skins according to the invention may be prepared using any conventional pressure forming method. Preferably, the mold assembly is provided with appropriate water cooling lines and a temperature control unit in conventional fashion for regulating the temperature of the mold assembly. The molds may assume a complex or detailed shape, providing for reinforced complex shapes having a reinforced foam core produced according to the invention.

In accordance with the present invention, the plastic melt (and thus the resultant part) comprises at least one thermoplastic material and reinforcement particles dispersed within the at least one thermoplastic material. The reinforcement particles about 2% to about 15% of a total volume of the plastic melt, at least 50% of the reinforcement particles have a thickness of less than about 20 layers, and at least 99% of the reinforcement particles have a thickness of less than about 30 layers. The reinforcement filler particles, also referred to as "nanoparticles" due to the magnitude of their dimensions, each comprise one or more generally flat platelets. Each platelet has a thickness of between 0.7–1.2 nanometers. Generally, the average platelet thickness is approximately 1 nanometer thick. The aspect ratio for each particle, which is the largest dimension divided by the thickness, is about 50 to about 300.

The platelet particles or nanoparticles are derivable from larger layered mineral particles. Any layered mineral capable of being intercalated may be employed in the present invention. Layered silicate minerals are preferred. The layered silicate minerals that may be employed include natural and artificial minerals. Non-limiting examples of more preferred minerals include montmorillonite, vermiculite, hectorite, saponite, hydrotalcites, kanemite, sodium octosilicate, magadiite, and kenyaite. Mixed Mg and Al hydroxides may also be used. Among the most preferred minerals is montmorillonite.

To exfoliate the larger mineral particles into their constituent layers, different methods may be employed. For example, swellable layered minerals, such as montmorillonite and saponite are known to intercalate water to expand the inter layer distance of the layered mineral, thereby facilitating exfoliation and dispersion of the layers uniformly in water. Dispersion of layers in water is aided by mixing with high shear. The mineral particles may also be exfoliated by a shearing process in which the mineral particles are impregnated with water, then frozen, and then dried. The freeze dried particles are then mixed into molten polymeric material and subjected to a high sheer mixing operation so as to peel individual platelets from multiplatelet particles and thereby reduce the particle sizes to the desired range.

The extruded plastic sheet utilized in accordance with the present invention is prepared by combining the platelet mineral with the desired polymer in the desired ratios. The components can be blended by general techniques known to those skilled in the art. For example, the components can be blended and then melted in mixers or extruders. Preferably, the plastic melt is first manufactured into pellet form. The pellets are then plasticized in the extruder to form a plastic melt, which exits the extruder in sheet form.

Additional specific preferred methods, for the purposes of the present invention, for forming a polymer composite having dispersed therein exfoliated layered particles are disclosed in U.S. Pat. Nos. 5,717,000, 5,747,560, 5,698,624, and WO 93/11190, each of which is hereby incorporated by reference. For additional background, the following are also incorporated by reference: U.S. Pat. Nos. 4,739,007 and 5,652,284

Preferably, the thermoplastic used for the purposes of the present invention is a polyolefin or a blend of polyolefins. The preferred polyolefin is at least one member selected from the group consisting of polypropylene, ethylene-propylene copolymers, thermoplastic olefins (TPOs), and thermoplastic polyolefin elastomers (TPEs).

The exfoliation of layered mineral particles into constituent layers need not be complete in order to achieve the objects of the present invention. The present invention contemplates that at least 50% of the particles should be less than about 20 nanometers in thickness and, thus, at least 50% of the particles should be less than about 20 layers thick. In addition, at least 99% of the reinforcement particles should have a thickness of less than about 30 nanometers, which is about 30 layers stacked in the thickness direction. With this extent of exfoliation, with a loading of less than 15% by volume, the benefits of the nanoparticles begin to accrue with meaningful effect for many large thin part applications. For example, such loading of nanoparticles will provide a desired increase in the modulus of elasticity by about 50–70% over conventional fillers. Preferably, about 2% to about 15%, even more preferably about 2% to about 8% loading in used to achieve desirable reinforcement.

More preferably, at least 50% of the particles should have a thickness of less than 10 nanometers. At this level, an additional increase of about 50–70% in the modulus of elasticity is achieved in comparison with the 50% of particles being less than 20 layers thick as discussed above. This provides a level of reinforcement and impact resistance that would be highly suitable for most motor vehicle part applications, such as reinforced insulated hard tops.

Preferably, at least 70% of the particles should have a thickness of less than 5 layers, which would achieve an additional 50–70% increase in the modulus of elasticity in comparison with the 50% of less than 10 layer thickness exfoliation discussed above. This provides ideal reinforcement and impact resistance for large thin parts that must withstand substantial impact. It is always preferable for at least 99% of the particles to have a thickness of less than about 30 layers, as particles greater than this size act as stress concentrators.

It is most preferable to have as many particles as possible to be as small as possible, ideally including only a single platelet.

As noted above, the preferred aspect ratio (which is the largest dimension divided by the thickness) for each particle is about 50 to about 300. At least 80% of the particles should be within this range. If too many particles have an aspect ratio above 300, the material becomes too viscous for forming parts in an effective and efficient manner. If too many particles have an aspect ratio of smaller than 50, the particle reinforcements will not provide the desired reinforcement characteristics. More preferably, the aspect ratio for each particle is between 100–200. Most preferably, at least 90% of the particles have an aspect ratio within the 100–200 range.

Generally, in accordance with the present invention, the plastic melt and hence the parts to be manufactured should contain less than 15% by volume of the reinforcement particles of the type contemplated herein. The balance of the part is to comprise an appropriate thermoplastic material and suitable additives. If greater than 15% by volume of reinforcement filler is used, the viscosity of the composition becomes too high and thus difficult to mold.

By utilizing plastic melt with the loading of nanoparticles discussed above (e.g., less than 15% of a total volume of the plastic melt), higher modulus of elasticity of conventional large plastic parts can be achieved, and thus be manufactured with a reduced wall thickness while maintaining the same required impact resistance. For example, the modulus of the material used to form an article may be increased to between about 200,000 to about 500,000 PSI (1378–3446 MPa).

In accordance with the present invention, addition of the exfoliated platelet material as set forth above permits the modulus of vacuum formed articles to be increased without significantly losing impact resistance. Because the modulus is increased, large parts, such as removable automobile hard tops, can be made thinner than what was otherwise possible. Such parts may also be insulated by reinforced foam, thereby adding sound proofing and thermal insulation to thinner hard tops without jeopardizing impact resistance. More specifically, hard tops for automobiles must have sufficient impact resistance or toughness to withstand various standard automotive impact tests, particularly roll over tests.

For example, an automotive hard top must withstand a typical impact test wherein the hard top will not crack or permanently deform upon impact. In a conventional IZOD impact test, it is desirable for the part to withstand at least 10-ft pounds/inch (535 J/m) at room temperature and at least 5-ft pounds/inch (263 J/m) at −300° C. In order to withstand cracking at such force levels, the modulus of a conventional automotive material is typically between about 70,000 to about 150,000 pounds per square inch (PS) (482–1034 MPa). In accordance with the present invention, the hard top modulus can be increased by a factor of 2 to 3 times, without significantly effecting the impact resistance.

In addition to the above mentioned benefits, use of the nanoparticle reinforced plastic melt enables the coefficient of linear thermal expansion to be reduced to less than $40 \times 10^{-6}$ inches of expansion per inch of material per degree Fahrenheit (IN/IN)/° F., or $72 \times 10^{-6}$ mm/mm/° C., which is less than 60% of what was previously achievable for thermoplastic motor vehicle parts that meet the required impact tests.

As a further benefit, the surface toughness of the hard top can be improved. The improved surface toughness provided by the nanoparticles greatly reduces handling damage and part scrap. This is a significant benefit to a part which by design is repeatedly removed from an automobile and must endure unexpected scraping, dropping and non-collision impact.

In addition, it is possible to more than double the modulus of polymers without significantly reducing toughness. Thus, it is possible to produce articles like hard tops using 20–35% thinner wall sections that will have comparable performance. The use of nanoparticles can provide the mechanical, thermal, and dimensional property enhancements, which are typically obtained by adding 20–50% by weight of glass fibers or mineral fillers or combinations thereof to polymers. However, only a few percent of nanoparticles are required to obtain these property enhancements.

As a result of the fact that such low levels of nanoparticles are required to obtain the requisite mechanical properties, many of the typical negative effects of the high loadings of conventional reinforcements and fillers are avoided or significantly reduced. These advantages include: lower specific gravity for a given level of performance, better surface appearance, toughness close to that of the unreinforced base polymer, and reduced anisotropy in the molded parts.

It is preferable for these articles to have reinforcement particles of the type described herein comprising about 2% to about 8% of the total volume of the article, with the balance comprising the thermoplastic substrate. It is even more preferable for removable hard tops to have reinforcement particles of the type contemplated herein comprising about 3%–5% of the total volume of the part.

In accordance with another specific embodiment of the present invention, it is contemplated that the blow molding apparatus can be used to make relatively large, highly reinforced parts having a modulus of elasticity of 1,000,000 (6892 MPa) or greater. Conventionally, these parts typically require loadings of 25–60% by volume of glass fiber reinforcement. This amount of glass fiber loading would result in a high viscosity of any melt pool that could be used in the blow molding apparatus of the present invention and would thus render the blow molding apparatus largely impractical for such application.

Sheets of the plastic melt described above enable the plug assisted thermoforming of large parts having impact resistance characteristics previously unattainable. For example, the thermoforming system of the present invention is able to manufacture relatively large articles having a modulus of elasticity of greater than 1,000,000 PSI (6892 MPa) by use of a plastic melt reinforced with loadings of about 8–15% by volume of nanoparticles, with at least 70% of the nanoparticles having a thickness of 10 layers or less. As with the above-described embodiment, the plastic melt used has substantially the same material composition as the article to be manufactured.

in this case of molding large parts with a modulus of elasticity greater than 1,000,000 PSI (6892 MPa), it may be desirable to use engineering resins instead of polyolefins. Such engineering resins may include polycarbonate (PC), acrylonitrile butadiene styrene (ABS), a PC/ABS blend, polyethylene terephthalates (PET), polybutylene terephthalates (PBT), polyphenylene oxide (PPO), or the like. Generally, these materials in an unreinforced state have a modulus of elasticity of about 300,000 PSI–350,000 PSI (2068–2412 MPa). At these higher loadings of nanoparticles (8–15% by volume), impact resistance will be decreased, but to a much lower extent than by the addition of the conventional 25–60% by volume of glass fibers.

Figure 2:
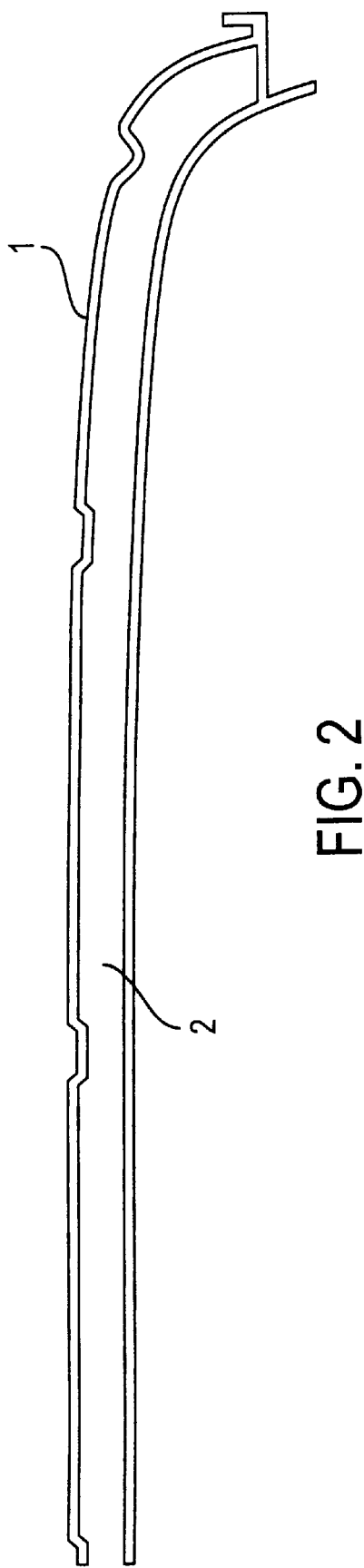
FIG. 2 shows a sectional view of the top depicted in FIG. 1.

The invention may be used to reinforce any item ordinarily produced by thermoforming. For example, removable automobile hard tops depicted in FIGS. 1 and 2, produced by plug assisted thermoforming may be reinforced using the inventive reinforcing particles. Such thermoformed hard tops further comprising structural foams having reinforcing nanoparticles exhibit better impact resistance, thermoinsulation and sound insulation than conventionally produced removable automobile hard tops.

Reinforced child safety seats may also be manufactured according to the invention. Reinforcing nanoparticles of the invention can strengthen the thermoformed shell of the seat as well as the foam cushioning within the seat. Child seats reinforced with nanoparticles have better ductility for impact energy absorption than seats having standard reinforcing materials. The increased strength and impact resistance of such safety seats affords better protection for seat occupants.

Reinforced articles having relatively thick walls may be produced according to the invention when the reinforced article comprises a thermoformed skin blown from a reinforced polymer sheet under vacuum using plug assistance. Larger, thicker, more complex articles may be formed according to the invention than is possible by blow molding unreinforced polymers or polymers reinforced by, for example, glass fibers. This is because the reinforcing particles of the invention may be evenly dispersed in molten resin, do not clump, and avoid generating stress points likely to induce tears in the melted polymer during the blowing/forming step.

Although certain embodiments of the invention have been described and illustrated herein, it will be readily apparent to those of ordinary skill in the art that a number of modifications and substitutions can be made to the blow molding system disclosed and described herein without departing from the true spirit and scope of the invention.

What is claimed is:

1. A method for thermoforming a reinforced article, comprising:

providing a reinforced plastic sheet comprising at least one thermoplastic material and reinforcement nanoparticles dispersed within the at least one thermoplastic material, the reinforcement particles comprising less than 15% of a total volume of the plastic sheet, at least 50% of the reinforcement particles having a thickness of less than about 20 layers, and at least 99% of the reinforcement particles having a thickness of less than about 30 layers;

preheating said plastic sheet;

communicating said preheated plastic sheet to a first mold assembly having a first mold cavity defined by mold surfaces, the mold surfaces corresponding to a configuration of the article to be molded, an amount of the plastic sheet communicated to the first mold assembly being sufficient to form a skin of the article;

applying a vacuum to one side of the first mold assembly while concurrently applying pressurized gas to an opposing side of the first mold assembly so as to force said heated plastic sheet into conformity with the mold surfaces;

cooling the conformed plastic sheet;

transferring the conformed plastic sheet to a second mold assembly;

introducing to the conformed plastic sheet a reinforced plastic melt made from material identical or different from that of the plastic sheet, said plastic melt having a blowing agent to achieve volume expansion and the production of a cellular reticulate structure;

cooling said plastic melt to form a solidified plastic member adhered to said conformed plastic sheet, said conformed plastic sheet and said adhered solidified plastic member together comprising said article; and removing said article from said second mold assembly.

* * * * *

UNITED STATES PATENT AND TRADEMARK OFFICE
CERTIFICATE OF CORRECTION

PATENT NO.   : 6,454,974 B1
DATED        : September 24, 2002
INVENTOR(S)  : Wilson It is certified that error appears in the above-identified patent and that said Letters Patent is hereby corrected as shown below:

Column 1,
Line 5, please add the following immediately following the Title of the Invention:

-- Governmental Support and Interest:

The invention in this patent was made with Governmental support under Cooperative Agreement No. 70NANB7H3028 awarded to the Dow Chemical Company and Decoma International of America, Inc. (formerly Magna International of America, Inc.), project ID 1997-02-0047B, project name "NANOCOMPOSITES – NEW LOW COST/HIGH STRENGTH MATERIALS FOR AUTOMOTIVE PARTS," awarded September 30, 1997 by the United States Department of Commerce, National Institute of Standards and Technology, Advanced Technology Program. The Government has certain rights in this invention. --

Signed and Sealed this

Sixth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,454,974 B1                                               Page 1 of 1
DATED         : September 24, 2002
INVENTOR(S)   : Wilson It is certified that error appears in the above-identified patent and that said Letters Patent is hereby corrected as shown below:

<u>Title page,</u>
Item [56], References Cited, OTHER PUBLICATIONS,
please add -- ABSTRACT -- JP 9302180A: "Vinyl Chloride Resin Composition for Powder Molding" --.

Signed and Sealed this

Third Day of June, 2003

JAMES E. ROGAN
*Director of the United States Patent and Trademark Office*